(12) United States Patent
Yamauchi et al.

(10) Patent No.: US 11,548,374 B2
(45) Date of Patent: Jan. 10, 2023

(54) ENGINE ROOM HEAT EXHAUSTING STRUCTURE

(71) Applicant: Mazda Motor Corporation, Hiroshima (JP)

(72) Inventors: Shinji Yamauchi, Aki-gun (JP); Syouta Yamada, Aki-gun (JP); Michio Saito, Aki-gun (JP); Masayoshi Enomoto, Aki-gun (JP); Yuki Ikawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 59 days.

(21) Appl. No.: 17/172,367

(22) Filed: Feb. 10, 2021

(65) Prior Publication Data

US 2021/0300173 A1    Sep. 30, 2021

(30) Foreign Application Priority Data

Mar. 24, 2020   (JP) .............................. JP2020-052538

(51) Int. Cl.
  *B60K 11/08*   (2006.01)
  *B60R 13/08*   (2006.01)
  *F01P 11/10*   (2006.01)

(52) U.S. Cl.
  CPC .......... *B60K 11/08* (2013.01); *B60R 13/0838* (2013.01); *F01P 11/10* (2013.01)

(58) Field of Classification Search
  CPC ....... B60K 11/08; B60R 13/0838; F01P 11/10
  See application file for complete search history.

(56) References Cited

U.S. PATENT DOCUMENTS

| 5,626,185 A | * | 5/1997 | Gielda | B60K 11/02 296/180.1 |
| 2007/0023238 A1 | * | 2/2007 | Ramsay | B60T 5/00 188/4 R |
| 2012/0318476 A1 | * | 12/2012 | Begleiter | B60T 5/00 165/51 |
| 2013/0146376 A1 | | 6/2013 | Nam et al. | |
| 2022/0169315 A1 | * | 6/2022 | Schlangen | B62D 25/084 |

FOREIGN PATENT DOCUMENTS

| JP | 6091782 B2 | 3/2017 |
| JP | 2020001425 A | 1/2020 |

* cited by examiner

*Primary Examiner* — Kevin A Lathers
(74) *Attorney, Agent, or Firm* — Alleman Hall Creasman & Tuttle LLP

(57) ABSTRACT

An engine room heat exhausting structure configured to discharge heat from an engine room, is provided, which includes an engine room accommodating an engine with cylinders lined up in a front-and-rear direction of a vehicle, a wheelhouse provided outside the engine room in a vehicle width direction, an exhaust emission control device disposed between the engine and the wheelhouse, a wheelhouse liner configured to protect an inner wall of the wheelhouse, a discharging part provided rearward of the exhaust emission control device and configured to discharge into the wheelhouse a part of air cooled the exhaust emission control device, and a guiding part provided to the wheelhouse liner and configured to guide the air discharged into the wheel house to underneath the vehicle in a rear part of the wheelhouse.

9 Claims, 6 Drawing Sheets

ENGINE ROOM HEAT EXHAUSTING STRUCTURE

TECHNICAL FIELD

The present disclosure relates to an engine room heat exhausting structure which discharges heat from an engine room of a vehicle.

BACKGROUND OF THE DISCLOSURE

Conventionally, an engine room where an engine which generates heat is accommodated is provided in a front part of a vehicle. The engine room is defined by a dash panel, front inside panels, and an engine hood. The dash panel defines a rear part of the engine room, the front inside panels define both sides in the vehicle width direction, and the engine hood defines an upper part. The heat generated inside the engine room is exhausted forward of a front window screen, into wheelhouses, and downward of the engine room, while utilizing air for cooling which is introduced into the engine room by a traveling wind (i.e., wind caused by the vehicle traveling).

Meanwhile, the engine may be covered by an engine cover in order to mainly improve sound insulation. Moreover, in order to protect the engine, etc. from a collision with a pebble while the vehicle travels and rectify air which passes through a space underneath the vehicle, an undercover may be attached for covering the engine room from below.

In such cases, since it becomes difficult to exhaust the heat from the engine room because of the engine cover and the undercover, structures for stimulating the heat discharge from the engine room have been examined. For example, like JP6091782B2, there is a known technology which defines the engine room by an engine encapsulation structure which covers the engine. The cooling air is introduced into the engine encapsulation structure from the front and flows rearward. Thus, the structure stimulates the heat discharge and improves the sound insulation, the thermal insulation, and the pedestrian protection when the vehicle collides with a pedestrian.

However, when a driving force transmission mechanism, such as the transmission, is disposed rearward of a lower part of the engine, since the cooling air which cooled the engine and became hot reaches the periphery of the driving force transmission mechanism, the driving force transmission mechanism may be overheated. Therefore, it is considered that the hot cooling air is discharged into the wheelhouses.

While the vehicle is traveling, air flows into the wheelhouses from the front, and then flows rearward to exit from the wheelhouses. Since turbulence occurs at this time to increase air resistance, it is known that air flowing into the wheelhouses from underneath of the vehicle is reduced by a deflector and air is drawn into the wheelhouses from the side of the vehicle to suppress the increase in the air resistance, for example, like JP2020-001425A.

However, when the cooling air is discharged into the wheelhouses, since the cooling air collides with the air flowing inside the wheelhouses to disturb the flow, air resistance increases. In addition, the cooling air may become difficult to be discharged into the wheelhouses, and therefore, the heat discharge from the engine room cannot be fully achieved.

SUMMARY OF THE DISCLOSURE

The present disclosure is made in view of addressing the situations described above, and one purpose thereof is to provide an engine room heat exhausting structure capable of suppressing an increase in air resistance when a vehicle travels, while stimulating the heat discharge from the engine room.

According to one aspect of the present disclosure, an engine room heat exhausting structure configured to discharge heat from an engine room, is provided. The structure includes an engine room accommodating an engine with cylinders lined up in a front-and-rear direction of a vehicle, a wheelhouse provided outside the engine room in a vehicle width direction, an exhaust emission control device disposed between the engine and the wheelhouse, a wheelhouse liner configured to protect an inner wall of the wheelhouse, a discharging part provided rearward of the exhaust emission control device and configured to discharge into the wheelhouse a portion of air cooled the exhaust emission control device, and a guiding part provided to the wheelhouse liner and configured to guide the air discharged into the wheelhouse to underneath the vehicle in a rear part of the wheelhouse.

According to this structure, the exhaust emission control device and an exhaust passage connected thereto/therefrom, which became especially high in temperature because hot exhaust gas after combustion passes through, are cooled from outside by cooling air introduced into the engine room from the front when the vehicle travels. The portion of the cooling air which became high in temperature after cooling the exhaust emission control device is discharged into the wheelhouse from the discharging part provided to the splash shield at a location rearward of the exhaust emission control device. The cooling air discharged into the wheelhouse is smoothly guided underneath the vehicle at the rear part of the wheelhouse while colliding with the air flowing inside the wheelhouse. Thus, the heat discharge from the engine room can be stimulated and an increase in air resistance when the vehicle travels can be suppressed.

The guiding part may have a curved surface part in a rearward lower end part of the wheelhouse liner, the curved surface part having such an arc shape in cross section that the curved surface part becomes lower toward the rear. According to this structure, since the cooling air discharged into the wheelhouse when the vehicle travels is smoothly guided underneath the vehicle by the curved surface part, the increase in the air resistance can be suppressed.

The guiding part may have an inclined part extending rearward from the curved surface part so that the inclined part becomes lower toward the rear, and the curved surface part and the inclined part may be formed integrally with the wheelhouse liner. According to this structure, since the cooling air discharged into the wheelhouse when the vehicle travels is smoothly guided underneath the vehicle by the curved surface part and the inclined part, the increase in air resistance can be suppressed.

The engine room heat exhausting structure may further include a heat shielding cover covering an upper surface part, side surface parts, and a rear surface part of the engine inside the engine room, and an undercover covering the engine room from below. The discharging part may be provided to a part of a splash shield configured to intercept water entering the engine room from the wheelhouse, between a lower end of the side surface part of the heat shielding cover and the undercover. According to this structure, the part of the cooling air introduced to the inside of the heat shielding cover from forward is discharged into the wheelhouse, from the discharging part provided to the splash shield at a location between the lower end of the side surface part of the heat shielding cover and the undercover. Therefore, the heat discharge from the engine room can be stimulated. Further, since the cooling air discharged into the wheelhouse is smoothly guided underneath the vehicle by the guiding part, the increase in the air resistance can be suppressed.

The air may be introduced into the engine room from the front through a front opening of the vehicle by traveling wind or a blower fan.

The wheelhouse is one of a pair of left and right wheelhouses accommodating front wheels and may be provided outside of the engine room in the vehicle width direction. The wheelhouse liner may be one of a pair of wheelhouse liners respectively configured to protect an inner wall of each of the wheelhouses and improve sound insulation, and may be attached to each of the wheelhouses. A respective splash shield may be fixed to a front side frame or to each of the wheelhouse liners. The discharging part may be formed by notching a part that is a rear part of one of the splash shields and rearward and downward of the exhaust emission control device, or by making a hole in the part.

The engine room heat exhausting structure may further include a heat shielding cover covering an upper surface part and side surface parts of the engine. The air introduced into the heat shielding cover from the engine room may flow rearward of a lower part of the engine, below the heat shielding cover and along an upper part or a side part of the engine. The air contacted the exhaust emission control device may be discharged into a rear part of the wheelhouse through the discharging part provided at an intermediate location of a channel where the air flows rearward of the lower part of the engine.

DETAILED DESCRIPTION OF THE DISCLOSURE

Hereinafter, one embodiment for implementing the present disclosure is described with reference to the accompanying drawings. The following desirable embodiment is merely illustration, and it is not intended to limit the present disclosure and applications thereof.

Figure 1:
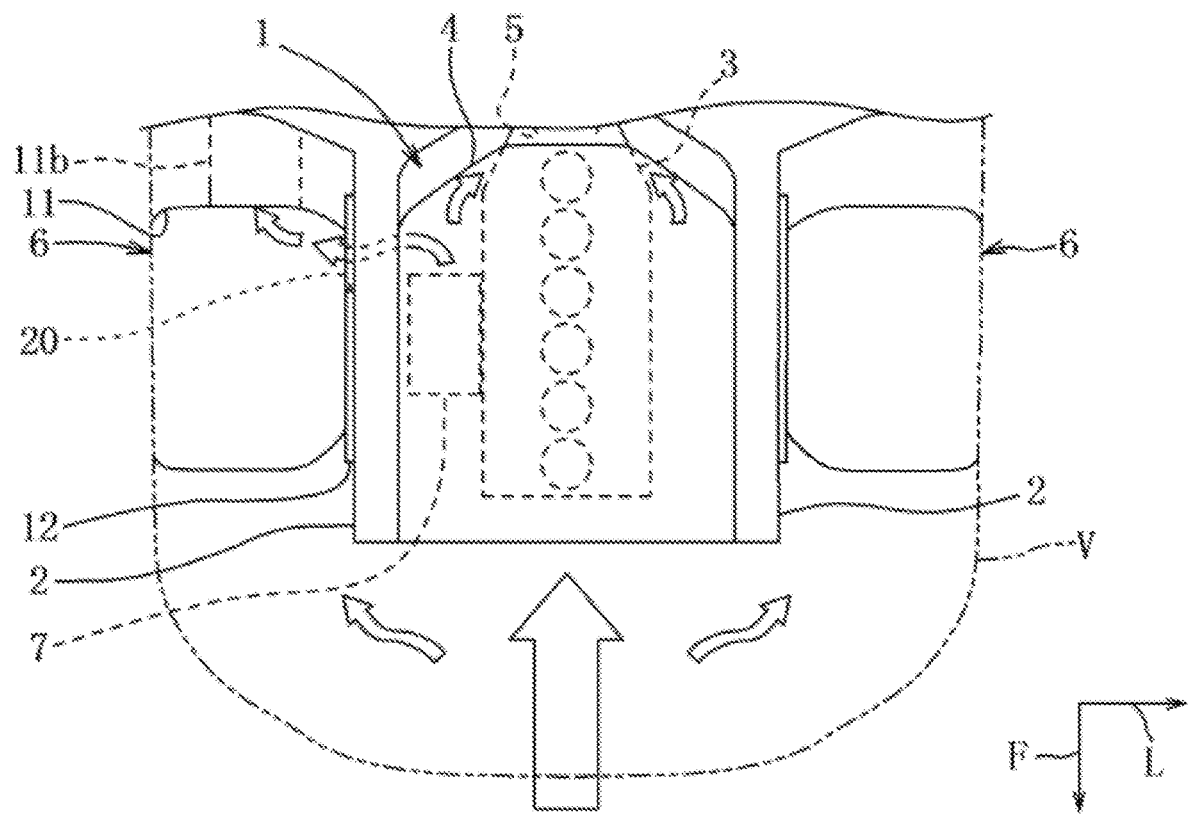
FIG. 1 is a view schematically illustrating a front part of a vehicle.

As illustrated in FIG. 1, an engine room 1 is provided in a front part of a vehicle V. Below, an arrow F, an arrow L, and an arrow U in the drawings indicate front, left, and up of the vehicle, respectively. Inside the engine room 1, a multi-cylinder engine 3 in which a plurality of cylinders are lined up in a front-and-rear direction (a so-called "longitudinal engine") is accommodated between a pair of front side frames 2 extending in the front-and-rear direction of the vehicle V. The engine 3 is covered by an engine cover (hereinafter, referred to as a "heat shielding cover 4") at an upper surface part, a rear surface part, and left and right side surface parts, and the part covering the upper surface part is openable and closable.

The engine room 1 is defined in a vehicle width direction by front inside panels (outside the figure) coupled to the pair of front side frames 2, and is defined in the front-and-rear direction by a dash panel (outside the figure) located between the engine room 1 and a cabin rearward of the engine room 1. A driving force transmission mechanism 5 having a transmission is disposed rearward of a lower part of the engine 3, and in order to transmit a driving force to rear wheels, the driving force transmission mechanism 5 extends rearward along a floor tunnel provided in a floor panel extending rearward from the dash panel (outside the figure). An upper part of the engine room 1 is covered by an engine hood (outside the figure) which is openable and closable.

The heat shielding cover 4 is made of, for example, a synthetic resin material, having a heat insulation function, and it divides an internal space of the engine room 1 into a high-temperature area inside the heat shielding cover 4 and a low-temperature area outside the heat shielding cover 4. In addition, it protects components (e.g., a battery) disposed outside the heat shielding cover 4 from heat of the engine 3. Moreover, the heat shielding cover 4 has a sound insulating function which covers the engine 3 and improves sound insulation, and a protective function which reduces an impact on a pedestrian between the pedestrian and the engine 3 when the vehicle collides with the pedestrian.

A radiator and a blower fan (both outside the figure) are disposed forward of the engine 3, and cooling air indicated by arrows is introduced into the engine room 1 normally from the front through a front opening of the vehicle V by a traveling wind (i.e., wind caused by the vehicle traveling) or the blower fan. The cooling air introduced inside the heat shielding cover 4 among the cooling air introduced into the engine room 1 flows toward the driving force transmission mechanism 5 rearward of the lower part of the engine 3, through between the engine 3 and the heat shielding cover 4. The cooling air which is not introduced inside the heat shielding cover 4 cools the components (e.g., the battery) outside the heat shielding cover 4.

A pair of left and right wheelhouses 6 which accommodate front wheels are provided outside of the engine room 1 in the vehicle width direction. Between the engine 3 and one of the wheelhouses 6, an exhaust emission control device 7 for purifying exhaust gas of the engine 3 is disposed. For example, an intake system which supplies air for combustion to the engine 3 is disposed on the left side of the engine 3, an exhaust system is disposed on the right side of the engine 3, and the exhaust emission control device 7 is disposed between the wheelhouse 6 of the right front wheel and the engine 3. Below, the wheelhouse 6 of the right front wheel and the exhaust emission control device 7 are mainly described, but the left and right wheelhouses 6 are largely symmetrical and most of the redundant description is omitted.

As illustrated in FIGS. 1 to 5, a wheelhouse liner 11 for protecting an inner wall of the wheelhouse 6 from a collision with a pebble, etc. and improving sound insulation is attached to the wheelhouse 6. Moreover, a splash shield 12 for intercepting water, a pebble, etc. which enter the engine room 1 from the wheelhouse 6 when the front wheels of the traveling vehicle V rotate is fixed to the front side frame 2, etc. with bolts, push rivets, etc. The wheelhouse liner 11 and the splash shield 12 are made of, for example, a synthetic resin material, in order to reduce the weight while reducing the noise caused by the collision with the pebble, etc.

In a lower part of the wheelhouse 6, a lower arm 14 rotatably supported by a sub-frame 8 extending in the front-and-rear direction below the front side frame 2 and a tie rod 15 which constitutes a steering mechanism extend from the center side in the vehicle width direction. A damper 16 with a coil spring is fixed at an upper part, for example, to a given location of a front inside panel 1*a*. A lower part of the damper 16 is attached to the lower arm 14, and they constitute a suspension mechanism. An engine mount 18 for fixing the engine 3 is fixed to the sub-frame 8 and the front side frame 2.

Figure 6:
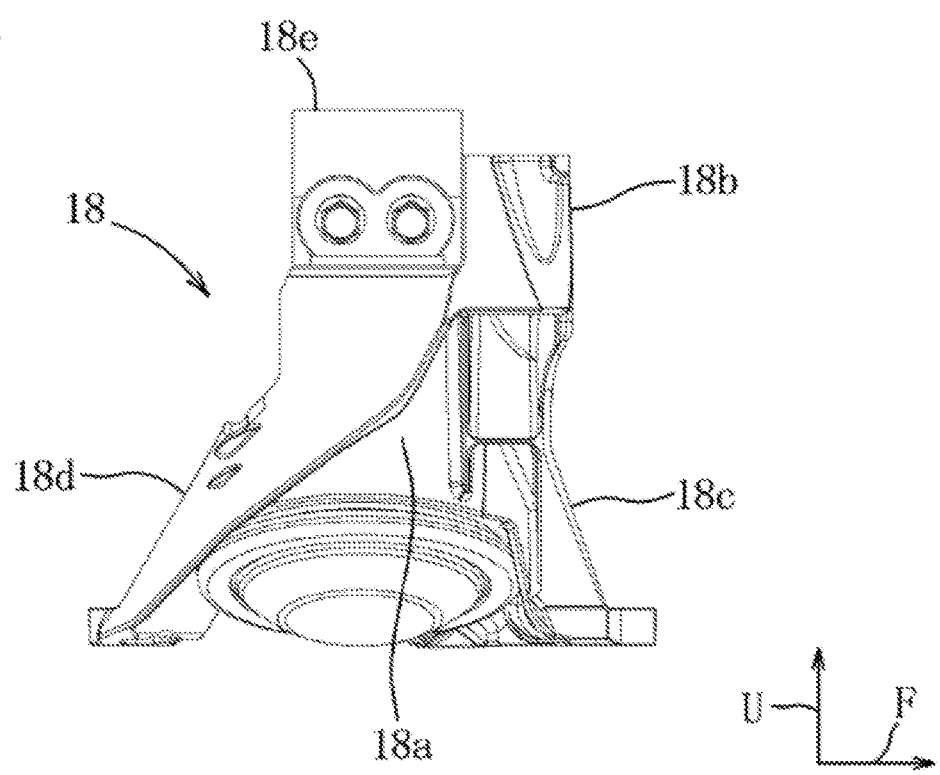
FIG. 6 is a side view of an engine mount.

As illustrated in FIG. 6, the engine mount 18 includes a cylindrical body part 18*a*, an upper fixing part 18*b* for fixing the body part 18*a* to the front side frame 2, and a front lower part fixing part 18*c* and a rear lower part fixing part 18*d* which are formed so that they spread in the front-and-rear direction as it goes downward from the upper fixing part 18*b* in order to fix the body part 18*a* to the sub-frame 8. The engine 3 is fixed to the body part 18*a* through a bracket 18*e*. The cylindrical body part 18*a* inclines so that an upper surface of the body part 18*a* to which the bracket 18*e* is fixed faces upward and inward in the vehicle width direction (see FIG. 4). The rear lower part fixing part 18*d* inclines downward and outward in the vehicle width direction so that it follows the inclination of the body part 18*a*.

Figure 5:
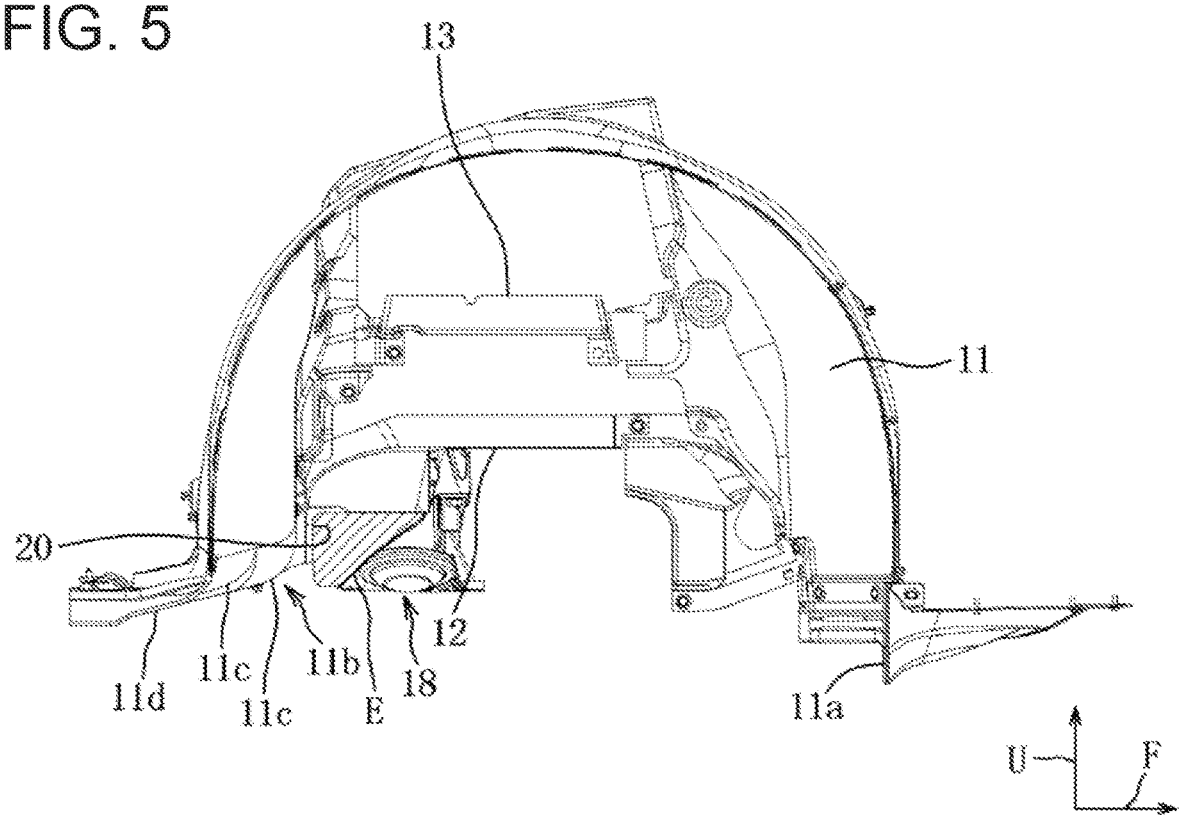
FIG. 5 is a view schematically illustrating a discharging part of a splash shield and a guiding part of the wheelhouse liner.

As illustrated in FIG. 5, the wheelhouse liner 11 is notched in a center part in the front-and-rear-direction from an upper part to a lower end of an inward part in the vehicle width direction, for the suspension mechanism, the steering mechanism, etc. The notched middle part of the wheelhouse liner 11 is coupled by the splash shield 12, and an upper part above the middle part is coupled by a connecting member 13.

Figure 2:
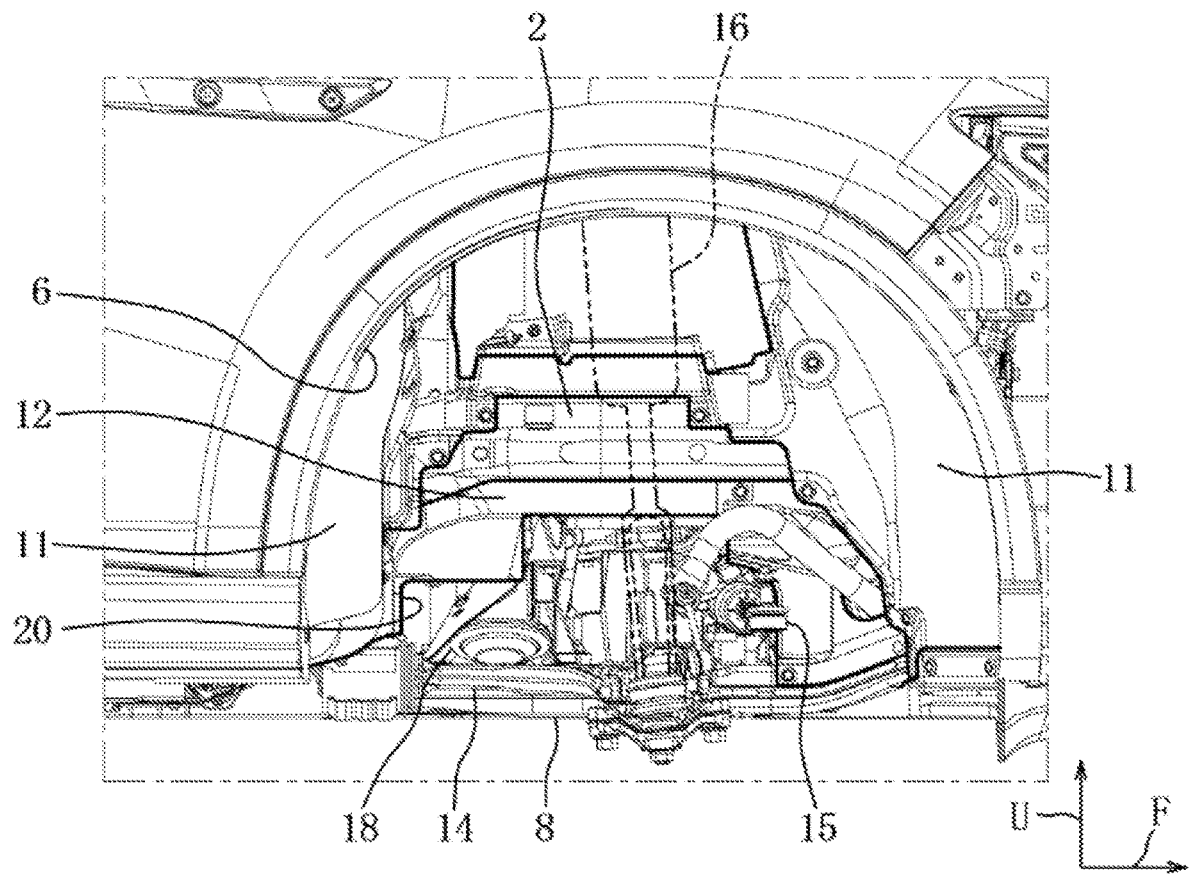
FIG. 2 is a side view illustrating a substantial part of a wheelhouse in a state where a wheelhouse liner is attached.
Figure 3:
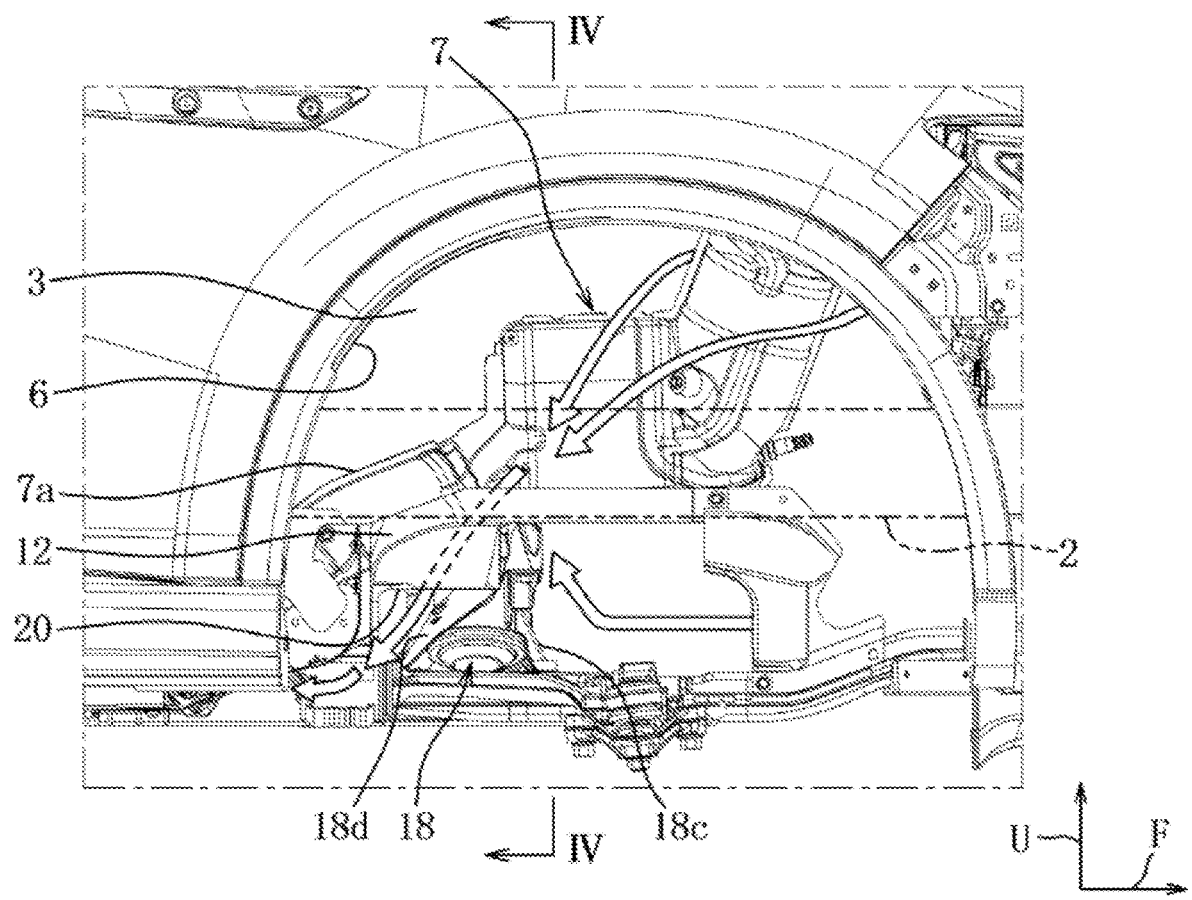
FIG. 3 is a side view illustrating a spatial relationship of a wheelhouse and an exhaust emission control device.
Figure 4:
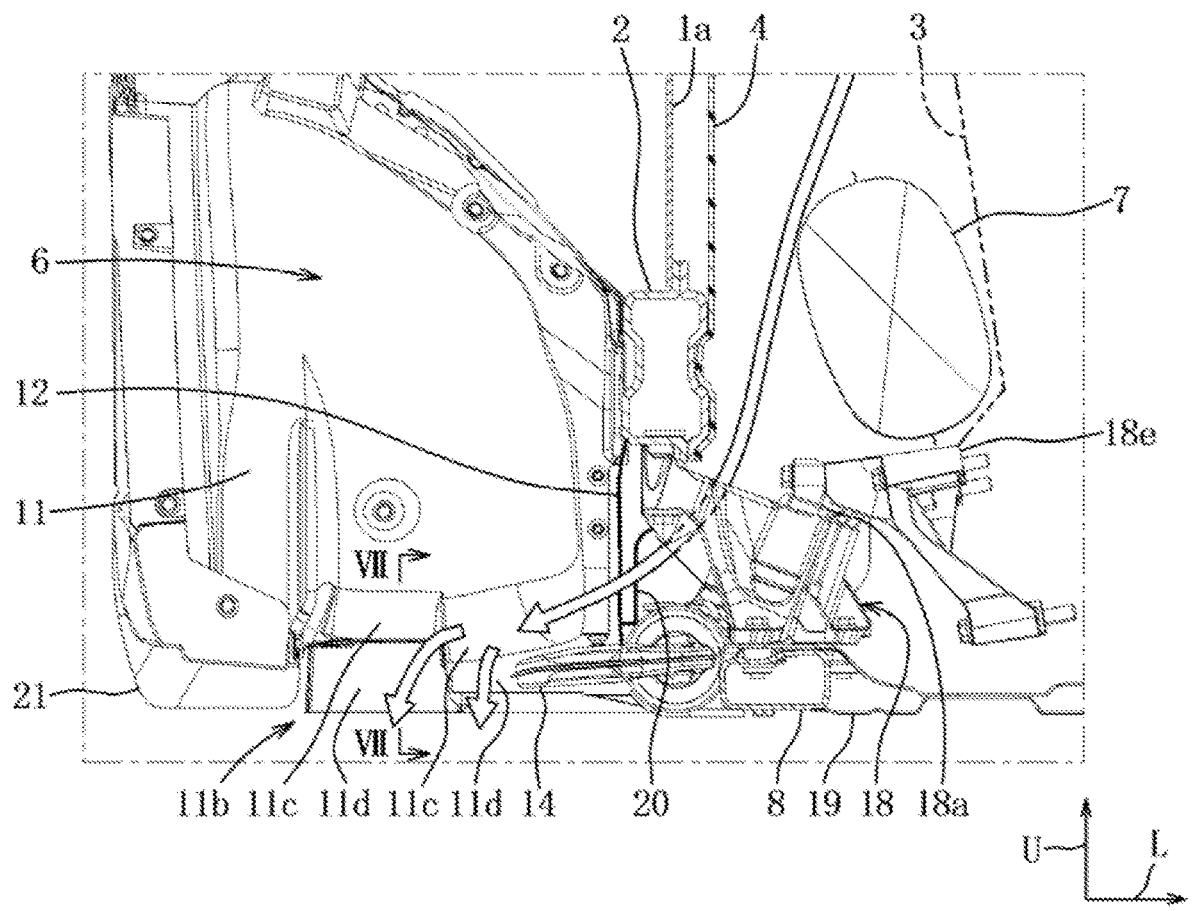
FIG. 4 is a cross-sectional view taken along a line IV-IV in FIG. 3.

As illustrated in FIGS. 2 to 4, above the splash shield 12, water entering the engine room 1 is intercepted because the wheelhouse 6 and the engine room 1 are divided by the front side frame 2 and the front inside panel 1*a* which extends upwardly from the front side frame 2. The exhaust emission control device 7 between the wheelhouse 6 and the engine 3 is disposed above the splash shield 12.

The exhaust emission control device 7 purifies exhaust gas of the engine 3 introduced from a front upper part thereof and discharges the purified exhaust gas to an exhaust passage 7*a* extending rearward from a rear lower part thereof. A lower end of a side surface part of the heat shielding cover 4 covering the engine 3 extends to a position so as to cover the lower end of the exhaust emission control device 7 and is fixed to the front side frame 2. A lower part of the engine room 1 is covered by an undercover 19 fixed to the sub-frame 8 so that it prevents the collision of the pebble to the engine 3 and rectifies air passing through a space underneath the vehicle V, while traveling.

As illustrated in FIG. 5, the splash shield 12 is provided with a discharging part 20 for communicating the engine room 1 with a rear part of the inside of the wheelhouse 6 via a hatched area E. This hatched area E is an opening area between the splash shield 12 and the rear lower part fixing part 18*d* of the engine mount 18, and is an area conventionally covered by the splash shield 12 for preventing water entering the engine room 1. The discharge of the cooling air from the discharging part 20 stimulates the heat discharge and suppresses the water entering the engine room 1 through the discharging part 20. In this embodiment, the discharging port 20 may be provided to only the wheelhouse 6 of the right front wheel and not the wheelhouse 6 of the left front wheel, because the exhaust emission control device 7 is provided to the right side of the vehicle.

This discharging part 20 is formed by notching a part which is a rear part of the splash shield 12 and rearward and downward of the exhaust emission control device 7, but it may be formed by making a hole in this part of the splash shield 12. Moreover, the discharging part 20 is provided rearward of a front end of the body part 18*a* of the engine mount 18. In addition, the discharging part 20 is provided in a part between the lower end of the side surface part of the heat shielding cover 4 and the undercover 19.

Figure 7:
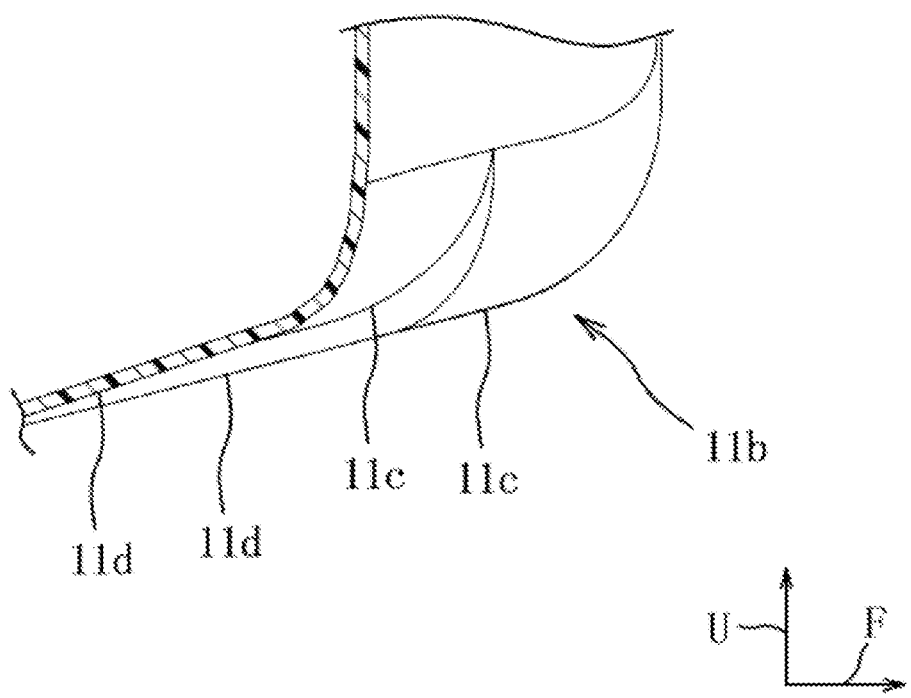
FIG. 7 is a cross-sectional view illustrating a part of the wheelhouse liner, taken along a line VII-VII in FIG. 4.

As illustrated in FIGS. 4, 5 and 7, a rearward lower end part of the wheelhouse liner 11 is provided with a guiding part 11*b* for guiding cooling air discharged into the wheelhouse 6 to underneath the vehicle V, in a rear part of the wheelhouse 6. A deflector 11*a* is attached to a forward lower end part of the wheelhouse liner 11, for reducing the air resistance by traveling wind (i.e., wind caused by the vehicle traveling) caught in the wheelhouse 6.

The guiding part 11*b* continues smoothly from the rearward lower end part of the wheelhouse liner 11, and has a curved surface part 11*c* having an arc shape in cross section so that it becomes lower as it goes rearward, and an inclined part 11*d* extending rearward from the curved surface part 11*c* so that it becomes lower as it goes rearward. The guiding part 11*b* including the curved surface part 11*c* and the inclined part 11*d* is formed integrally with the wheelhouse liner 11. The cooling air discharged into the wheelhouse 6 flows along the guiding part 11*b*, and is smoothly led to underneath the vehicle V in the rear part of the wheelhouse 6.

For example, along the shape of the lower part of the vehicle V, the guiding part 11*b* has two curved surface parts 11*c* disposed in the vehicle width direction, and two inclined parts 11*d* corresponding to the two curved surface parts 11*c*. The two curved surface parts 11*c* and the two inclined parts 11*d* have the same function, and they lead the cooling air rearward at a location inward of a side sill garnish 21 in the vehicle width direction, which protects a side sill rearward of the wheelhouse 6.

Operation and effects of the engine room heat exhausting structure of this embodiment are described. When the vehicle V travels, the cooling air is introduced into the engine room 1 from the front due to the traveling wind. The cooling air is divided into what is discharged forward of a front window screen, what is discharged into the wheelhouse 6, and what is discharged downwardly from the rear part of the vehicle through the floor tunnel.

The cooling air introduced into the heat shielding cover 4 from the engine room 1 flows rearward of the lower part of the engine 3 along the upper part or the side part of the engine 3. As illustrated by the arrows in FIGS. 1, 3 and 4, among them, the cooling air which flows along the side part of the engine 3 on the exhaust system side flows near the exhaust emission control device 7 and cools the exhaust emission control device 7.

A portion of the cooling air which became high in temperature after cooling the exhaust emission control device 7 flows rearward of the lower part of the engine 3, and on the way, it flows from the inside of the heat shielding cover 4 into the engine room 1. Then, the cooling air is discharged to the rear part of the wheelhouse 6 through the discharging part 20 provided at the intermediate location of the flow of the cooling air rearward of the lower part of the engine 3. The cooling air discharged into the wheelhouse 6 is guided rearward of the wheelhouse 6 by the guiding part 11*b*, and is smoothly guided underneath the vehicle V at the rear part of the wheelhouse 6. Therefore, the heat discharge inside the engine room 1 can be stimulated, and the increase in air resistance which is caused by the cooling air colliding with the air flowing inside the wheelhouse 6 to disturb the flow when the vehicle travels can be suppressed.

The guiding part 11b has the curved surface part 11c having the arc shape in cross section in the rearward lower end part of the wheelhouse liner 11 so that it becomes lower as it goes rearward. Thus, since the cooling air discharged into the wheelhouse 6 is guided rearward of the wheelhouse 6 by the curved surface part 11c while the vehicle V is traveling and is smoothly guided underneath the vehicle V, the increase in air resistance when the vehicle travels can be suppressed.

Moreover, the guiding part 11b has the inclined part 11d extending rearward of the vehicle V from the curved surface part 11c so that it becomes lower as it goes rearward, and the guiding part 11b including the curved surface part 11c and the inclined part 11d is formed integrally with the wheelhouse liner 11. Therefore, since the cooling air discharged into the wheelhouse 6 is guided rearward of the wheelhouse 6 by the curved surface part 11c and the inclined part 11d and is smoothly guided underneath the vehicle V while the vehicle V is traveling, the increase in the air resistance when the vehicle travels can be suppressed.

Moreover, the cooling air which came out from the heat shielding cover 4 into the engine room 1 flows rearward of the lower part of the engine 3 along the side part of the engine 3, without being discharged downwardly from the vehicle V because of the undercover 19. The portion of the cooling air is discharged into the wheelhouse 6 on the way of the flow route, from the discharging part 20 which is provided in the part of the splash shield 12 between the lower end of the side surface part of the heat shielding cover 4 and the undercover. Therefore, the heat discharge from the engine room 1 can be stimulated.

The above description concerns a configuration in which the exhaust emission control device 7 is provided between the engine 3 and the wheelhouse 6 of the right front wheel. However, the exhaust emission control device 7 may be disposed between the wheelhouse 6 for the left front wheel and the engine 3, and, for example, when the engine 3 is a V-engine, it may be disposed at both the left and the right. Also similarly in these cases, by providing the discharging part 20 of the splash shield 12 and the guiding part 11b of the wheelhouse liner 11 to the wheelhouse(s) 6 corresponding to the exhaust emission control device(s) 7, the heat discharge from the engine room 1 can be stimulated, and the increase in air resistance when the vehicle travels can be suppressed. Note that various modifications of the above embodiment are possible by the person skilled in the art without departing from the spirit of the present disclosure, and the present disclosure also encompasses these modifications.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1: Engine Room
2: Front Side Frame
3: Engine
4: Heat Shielding Cover
5: Driving Force Transmission Mechanism
6: Wheelhouse
7: Exhaust Emission Control Device
8: Sub-frame
11: Wheelhouse Liner
11a: Deflector
11b: Guiding Part
11c: Curved Surface Part
11d: Inclined Part
12: Splash Shield
14: Lower Arm
15: Tie Rod
16: Damper
18: Engine Mount
18c: Front Lower Part Fixing Part
18d: Rear Lower Part Fixing Part
19: Undercover
20: Discharging Part
21: Side Sill Garnish

What is claimed is:

1. An engine room heat exhausting structure configured to discharge heat from an engine room, comprising:
   an engine room accommodating an engine with cylinders lined up in a front-and-rear direction of a vehicle;
   a wheelhouse provided outside the engine room in a vehicle width direction;
   an exhaust gas purification device disposed between the engine and the wheelhouse;
   a wheelhouse liner configured to protect an inner wall of the wheelhouse;
   a discharging part provided rearward of the exhaust gas purification device and configured to discharge into the wheelhouse a portion of air that cooled the exhaust gas purification device; and
   a guiding part provided to the wheelhouse liner and configured to guide the air discharged into the wheelhouse to underneath the vehicle in a rear part of the wheelhouse.

2. The engine room heat exhausting structure of claim 1, wherein the guiding part has a curved surface part in a rearward lower end part of the wheelhouse liner, the curved surface part having such an arc shape in cross section that the curved surface part becomes lower toward the rear.

3. The engine room heat exhausting structure of claim 2, wherein the guiding part has an inclined part extending rearward from the curved surface part so that the inclined part becomes lower toward the rear, and the curved surface part and the inclined part are formed integrally with the wheelhouse liner.

4. The engine room heat exhausting structure of claim 3, further comprising:
   a heat shielding cover covering an upper surface part, side surface parts, and a rear surface part of the engine inside the engine room; and
   an undercover covering the engine room from below,
   wherein the discharging part is provided to a part of a splash shield configured to intercept water entering the engine room from the wheelhouse, between a lower end of the side surface part of the heat shielding cover and the undercover.

5. The engine room heat exhausting structure of claim 1, further comprising:
   a heat shielding cover covering an upper surface part, side surface parts, and a rear surface part of the engine inside the engine room; and
   an undercover covering the engine room from below, wherein the discharging part is provided to a part of a splash shield configured to intercept water entering the engine room from the wheelhouse, between a lower end of the side surface part of the heat shielding cover and the undercover.

6. The engine room heat exhausting structure of claim 1, wherein the air is introduced into the engine room from the front through a front opening of the vehicle by traveling wind or a blower fan.

7. The engine room heat exhausting structure of claim 5, wherein the wheelhouse is one of a pair of left and right wheelhouses accommodating front wheels and provided outside of the engine room in the vehicle width direction,
wherein the wheelhouse liner is one of a pair of wheelhouse liners respectively configured to protect the inner wall of each of the wheelhouses and improve sound insulation, and are attached to each of the wheelhouses,
wherein a respective splash shield is fixed to a front side frame or to each of the wheelhouse liners, and
wherein the discharging part is formed by notching a part that is a rear part of one of the splash shields and rearward and downward of the exhaust gas purification device, or by making a hole in the part.

8. The engine room heat exhausting structure of claim 7, further comprising a heat shielding cover covering an upper surface part and side surface parts of the engine,
wherein the air introduced into the heat shielding cover from the engine room flows rearward of a lower part of the engine, below the heat shielding cover and along an upper part or a side part of the engine, and
wherein the air contacted the exhaust gas purification device is discharged into the rear part of the wheelhouse through the discharging part provided at an intermediate location of a channel where the air flows rearward of the lower part of the engine.

9. The engine room heat exhausting structure of claim 1, further comprising a heat shielding cover covering an upper surface part and side surface parts of the engine,
wherein the air introduced into the heat shielding cover from the engine room flows rearward of a lower part of the engine, below the heat shielding cover and along an upper part or a side part of the engine, and
wherein the air contacted the exhaust gas purification device is discharged into the rear part of the wheelhouse through the discharging part provided at an intermediate location of a channel where the air flows rearward of the lower part of the engine.

* * * * *